United States Patent
Tran et al.

(10) Patent No.: US 12,450,852 B2
(45) Date of Patent: Oct. 21, 2025

(54) ALIGNMENT OF AUGMENTED REALITY COMPONENTS WITH THE PHYSICAL WORLD

(71) Applicant: Snap Inc., Santa Monica, CA (US)

(72) Inventors: Lien Le Hong Tran, Santa Monica, CA (US); Olha Borys, Vienna (AT); Ilteris Kaan Canberk, Marina Del Rey, CA (US); Tobias Maier, Vienna (AT); Jakob Zillner, Absdorf (AT)

(73) Assignee: Snap Inc., Santa Monica, CA (US)

( * ) Notice: Subject to any disclaimer, the term of this patent is extended or adjusted under 35 U.S.C. 154(b) by 262 days.

(21) Appl. No.: 18/305,887

(22) Filed: Apr. 24, 2023

(65) Prior Publication Data

US 2024/0355079 A1    Oct. 24, 2024

(51) Int. Cl.
```
G06T 19/20      (2011.01)
G06T 5/20       (2006.01)
G06T 19/00      (2011.01)
G06V 10/44      (2022.01)
G06V 10/74      (2022.01)
```
(52) U.S. Cl.
CPC .............. *G06T 19/20* (2013.01); *G06T 5/20* (2013.01); *G06T 19/006* (2013.01); *G06V 10/44* (2022.01); *G06V 10/761* (2022.01); *G06T 2219/2004* (2013.01)

(58) Field of Classification Search
None
See application file for complete search history.

(56) References Cited

U.S. PATENT DOCUMENTS

| | | |
|---|---|---|
| 7,162,054 B2 | 1/2007 | Meisner et al. |
| 10,115,234 B2 * | 10/2018 | Dooley ................... G06F 9/455 |
| 11,126,881 B2 | 9/2021 | Masci |
| 11,961,251 B2 | 4/2024 | Borys et al. |
| 2016/0086322 A1 | 3/2016 | Arita et al. |
| 2017/0039731 A1 * | 2/2017 | Liu .......................... G06T 7/60 |
| 2017/0287218 A1 * | 10/2017 | Nuernberger ....... G06F 3/04845 |
| 2020/0302681 A1 | 9/2020 | Totty et al. |
| 2021/0398306 A1 | 12/2021 | Bleyer et al. |
| 2022/0375112 A1 | 11/2022 | Borys et al. |

(Continued)

FOREIGN PATENT DOCUMENTS

| | | |
|---|---|---|
| WO | 2022245961 | 11/2022 |
| WO | WO-2024226407 A1 | 10/2024 |

OTHER PUBLICATIONS

"International Application Serial No. PCT/US2022/029855, International Search Report mailed Aug. 24, 2022", 5 pgs.

(Continued)

*Primary Examiner* — Ryan M Gray
(74) *Attorney, Agent, or Firm* — Schwegman Lundberg & Woessner, P.A.

(57) ABSTRACT

A system is disclosed, including a processor and a memory. The memory stores instructions that, when executed by the processor, configure the system to perform operations. Surface plane information is obtained, defining a surface plane passing through a surface location and oriented according to a surface normal. An edge is detected in an image. Virtual content is presented, having a virtual position based on an orientation of the edge and the surface plane information.

20 Claims, 9 Drawing Sheets

(56) References Cited

U.S. PATENT DOCUMENTS

2022/0377306 A1 11/2022 Borys et al.
2024/0177328 A1 5/2024 Borys et al.

OTHER PUBLICATIONS

"International Application Serial No. PCT/US2022/029855, Written Opinion mailed Aug. 24, 2022", 5 pgs.
Nguyen, Thanh, "Structural Modeling from Depth Image", IEEE Transactions On Visualization and Computer Graphics, vol. 21, No. 11, (Nov. 15, 2015), 1230-1240.
Jabalemeli, Amirhossein, "From Single 2D Depth Image to Gripper 6D Pose Estimation: A Fast and Robust Algorithm for Grabbing Objects in Cluttered Scenes", Robotics, 8(63), (2019), 24 pgs.
Schenk, Fabian, "Robust Edge-based Visual Odometry using Machine-Learned Edges", IEEE RSJ International Conference on Intelligent Robots and Systems (IROS), (2017), 8 pgs.
"U.S. Appl. No. 17/747,592, Non Final Office Action mailed Oct. 5, 2023", 11 pgs.
"U.S. Appl. No. 17/747,592, Notice of Allowance mailed Nov. 29, 2023", 8 pgs.
"U.S. Appl. No. 17/747,592, Response filed Nov. 14, 2023 to Non Final Office Action mailed Oct. 5, 2023", 11 pgs.
"International Application Serial No. PCT/US2024/025549, International Search Report mailed Jul. 18, 2024", 4 pgs.
"International Application Serial No. PCT/US2024/025549, Written Opinion mailed Jul. 18, 2024", 7 pgs.
Kim, H, et al., "3D reconstruction from stereo images for interactions between real and virtual objects", Signal Processing. Image Communication, Elsevier Science Publishers, Amsterdam, NL, vol. 20, No. 1, (Jan. 1, 2005), 15 pgs.
Piazzi, J, et al., "Plane Detection with Stereo Images", IEEE International Conference On Robotics and Automation (ICRA) : Orlando, Florida, IEEE Operations Center, Piscataway, NJ, (May 15-19, 2006), 6 pgs.
Tobias, Langlotz, et al., "Sketching up the world: in situ authoring for mobile Augmented Reality", Personal and Ubiquitous Computing, Springer Verlag, London, GB, vol. 16, No. 6, (Aug. 1, 2012), 8 pgs.
"U.S. Appl. No. 18/435,797, Notice of Allowance mailed Apr. 9, 2025", 7 pgs.

\* cited by examiner

ALIGNMENT OF AUGMENTED REALITY COMPONENTS WITH THE PHYSICAL WORLD

BACKGROUND

Augmented reality (AR) involves the presentation of virtual content to a user such that the virtual content appears to be attached to, or to otherwise interact with, a real-world physical object. Presentation of virtual content in AR can therefore be enhanced by accurate estimation of the locations, orientations, and dimensions of real-world physical objects in the user's environment.

The orientation of an AR device (e.g., AR glasses) can be determined using various techniques, e.g., using data generated by an inertial measurement unit (IMU) of the AR device. Once the orientation of an AR device is known and given additional data regarding real-world objects in the environment, such as optical sensor data and/or depth sensor data, various techniques have been developed to determine or estimate the locations, orientations, and/or dimensions of those objects. One such technique is disclosed in U.S. patent application Ser. No. 17/747,592, filed 2022 May 18, and published as US 2022/0375112 A1, entitled "Continuous surface and depth estimation." In the disclosed technique, a color camera image of the environment in front of an AR device is used to determine the distance (i.e., depth) to a surface in front of the AR device. Thus, the disclosed technique provides an efficient, accurate means of estimating the orientation and location of a surface plane in the user's environment, relying only on commonly used and versatile optical sensors such as color cameras.

Other known techniques include the use of depth sensors such as Light Detection and Ranging (LIDAR) sensors to estimate the various characteristics of surfaces in the environment. However, such techniques tend to be computationally expensive and require specialized depth sensors. These limitations can be particularly salient in the context of AR devices, which tend to be small in size to allow for their easy use, and may therefore have limited available computing hardware and sensors.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Presentation of virtual content can be enhanced by placement of virtual objects such that their location and orientation is consistent with the locations and orientations of the real-world objects with which they appear to interact. Thus, for example, the perceived realism of a virtual object may be enhanced by placing and orienting it such that it appears to abut a surface of a real-world object in the same way that another real-world object would. However, if a surface plane of the real-world object is the only constraint imposed on placement of the virtual object, the location and orientation of the virtual object abutting the planar surface is still arbitrary with respect to at least three degrees of freedom: X and Y coordinates within the plane of the planar surface, and rotation about the surface normal of the surface plane.

Accordingly, it may be beneficial to provide techniques for orienting and locating a virtual object to have a specific location and orientation with respect to the location and orientation of an edge of a surface of a real-world object. By placing the virtual object in a particular location and orientation relative to an edge of the surface of the real-world object, the virtual object can be presented to appear more natural and more useful to the user. Thus, for example, if a user pins a virtual note to a real-world wall surface, the virtual note can be automatically oriented such that its top edge is parallel to the top edge of the wall surface, and/or an anchor point of the virtual note may be located such that it has a fixed vertical offset from the top edge of the wall surface and/or a fixed horizontal offset from a right or left endpoint of the top edge of the wall surface. Similarly, if a user places a virtual clock object on a real-world desktop surface, the virtual clock object can be automatically oriented to face toward a front edge of the desktop surface, and/or to have a fixed Y-direction offset from the front edge and/or a fixed X-direction offset from a left or right endpoint of the front edge.

Examples described herein may attempt to address one or more technical problems related to the placement of AR content. Some examples may allow AR content to be aligned with edges of real-world surfaces in a computationally efficient manner, using only commonly used and versatile optical sensors such as color cameras.

Figure 1:
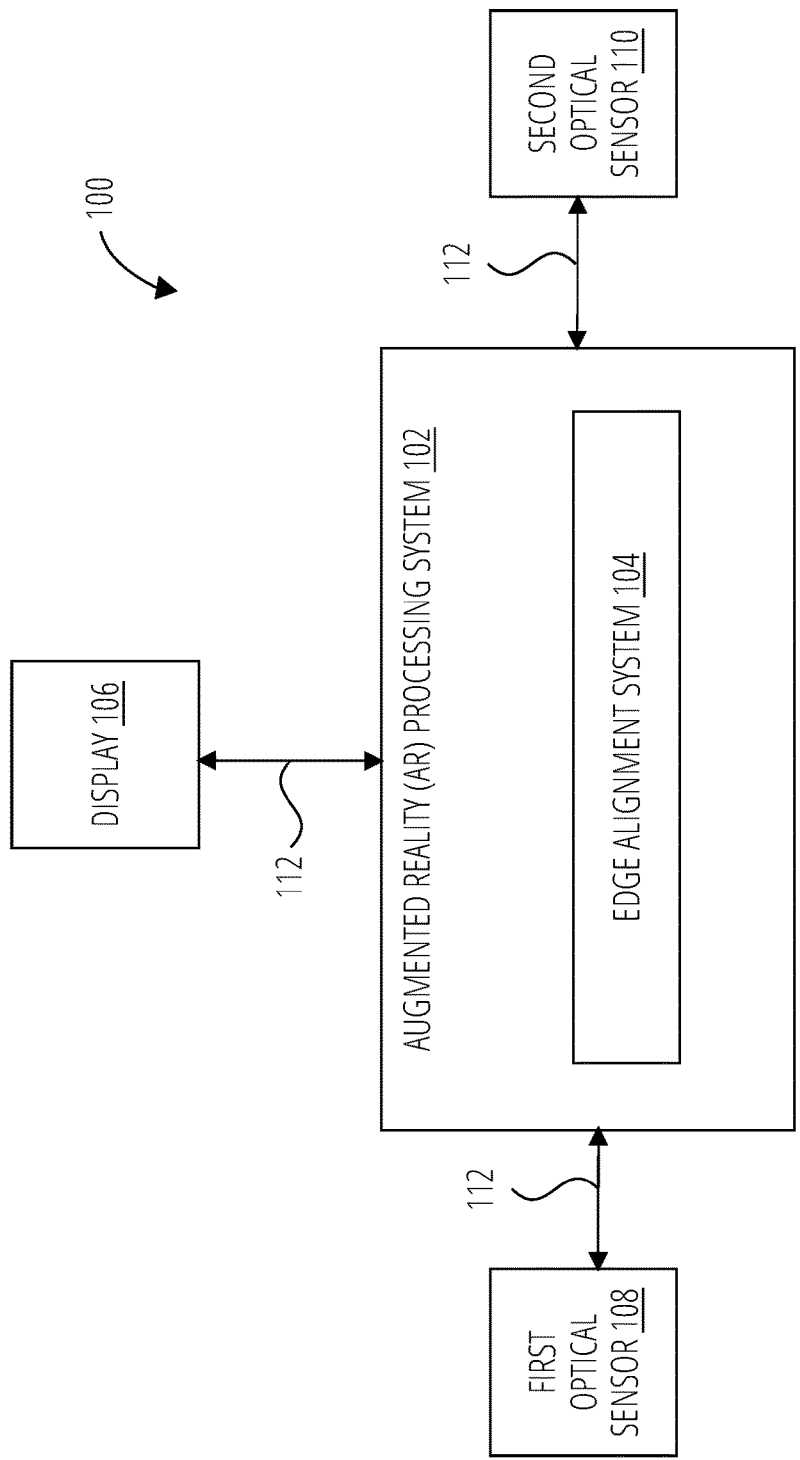
FIG. 1 is a block diagram of an AR device configured to perform edge alignment, according to some examples.

FIG. 1 shows a block diagram of an AR device 100 configured to perform edge alignment. The AR device 100 provides functionality to augment the real-world environment of a user. For example, the AR device 100 allows for a user to view real-world objects in the user's physical environment along with virtual content to augment the user's environment. In some examples, the virtual content may provide the user with data describing the user's surrounding physical environment, such as presenting data describing nearby businesses, providing directions, displaying weather information, and the like.

The virtual content may be presented to the user based on the distance and orientation of the physical objects in the user's real-world environment. For example, the virtual content may be presented to appear overlaid on a surface of a real-world object. As an example, virtual content describing a recipe may be presented to appear overlaid over the surface of a kitchen counter. As another example, virtual content providing directions to a destination may be presented to appear overlaid on the surface of a path (e.g., street, ground) that the user is to follow to reach the destination.

In some embodiments, the AR device 100 may be a mobile device, such as a smartphone or tablet, that presents real-time images of the user's physical environment along with virtual content. Alternatively, the AR device 100 may be a wearable device, such as a helmet or glasses, that allows for presentation of virtual content in the line of sight of the user, thereby allowing the user to view both the virtual content and the real-world environment simultaneously.

As shown, the AR device 100 includes a first optical sensor 108, a second optical sensor 110, and a display 106 connected to and configured to communicate with an AR processing system 102 via communication links 112. The communication links 112 may be either physical or wireless. For example, the communication links 112 may include physical wires or cables connecting the first optical sensor 108, second optical sensor 110, and display 106 to the AR processing system 102. Alternatively, the communication links 112 may be wireless links facilitated through use of a wireless communication protocol, such as Bluetooth™.

Each of the first optical sensor 108, second optical sensor 110, display 106, and AR processing system 102 may include one or more devices capable of network communication with other devices. For example, each device can include some or all of the features, components, and peripherals of the machine 800 shown in FIG. 8.

The first optical sensor 108 and second optical sensor 110 may be any type of sensor capable of capturing image data. For example, the first optical sensor 108 and second optical sensor 110 may be cameras, such as color cameras, configured to capture images and/or video. The images captured by the first optical sensor 108 and second optical sensor 110 are provided to the AR processing system 102 via the communication links 112.

To allow for use of stereo vision, the first optical sensor 108 and second optical sensor 110 are displaced at a known distance from one another to capture overlapping images depicting two differing views of the real-world environment from two different vantage points. The orientation of the optical sensors 108, 110 within, or relative to, the AR device 100 is calibrated to provide a known image transformation between the two optical sensors 108, 110. The image transformation is a function that maps the location of a pixel in one image to the corresponding location of the pixel in the corresponding image.

For the image transformation to properly map the location of pixels between the images, the optical sensors 108, 110 are positioned at a predetermined distance from each other and aligned to capture a specific vantage point. The vantage point of each optical sensor 108, 110 indicates the field of view and focal point captured by the optical sensor 108, 110. The known distance between the optical sensors 108, 110 and the known vantage point of each optical sensor 108, 110 can be used to calculate the transformation between images captured by each of the optical sensors 108, 110.

The display 106 may be any of a variety of types of displays capable of presenting virtual content. For example, the display 106 may be a monitor or screen upon which virtual content may be presented simultaneously with images of the user's physical environment. Alternatively, the display 106 may be a transparent display that allows the user to view virtual content being presented by the display 106 in conjunction with real world objects that are present in the user's line of sight through the display 106.

The AR processing system 102 is configured to provide AR functionality to augment the real-world environment of the user. For example, the AR processing system 102 generates and causes presentation of virtual content on the display 106 based on the physical location of the surrounding real-world objects to augment the real-world environment of the user. The AR processing system 102 presents the virtual content on the display 106 in a manner to create the perception that the virtual content is overlaid on a physical object. For example, the AR processing system 102 may generate the virtual content based on a determined surface plane that indicates a location (e.g., defined by a depth and a direction) and surface normal of a surface of a physical object. The depth indicates the distance of the real-world object from the AR device 100. The direction indicates a direction relative to the AR device 100, e.g., as indicated by a pixel coordinate of the image captured by one of the optical sensors 108, 110, which corresponds to a known angular displacement from a central optical axis of the optical sensor. The surface normal is a vector that is perpendicular to the surface of the real-world object at a particular point. The AR processing system 102 uses the surface plane to generate and cause presentation of the virtual content to create the perception that the virtual content is overlaid on the surface of the real-world object, with the virtual content located and oriented to with a specific relationship to an edge of the surface of the real-world object.

The AR processing system 102 includes an edge alignment system 104. The edge alignment system 104 determines a surface plane of a real-world object, determines an edge visible in an image captured by one of the optical sensors 108, 110, and determines a 3D line defined by the edge projected onto the surface plane.

The edge alignment system 104 provides data defining the determined surface plane, and the 3D line of the determined edge, to the AR processing system 102. In turn, the AR processing system 102 may use the determined surface plane and the determined 3D line to generate and present virtual content that appears to be overlaid on the surface of the object in a specific relationship to the 3D line, such as aligned parallel to and adjacent to the 3D line.

Figure 2:
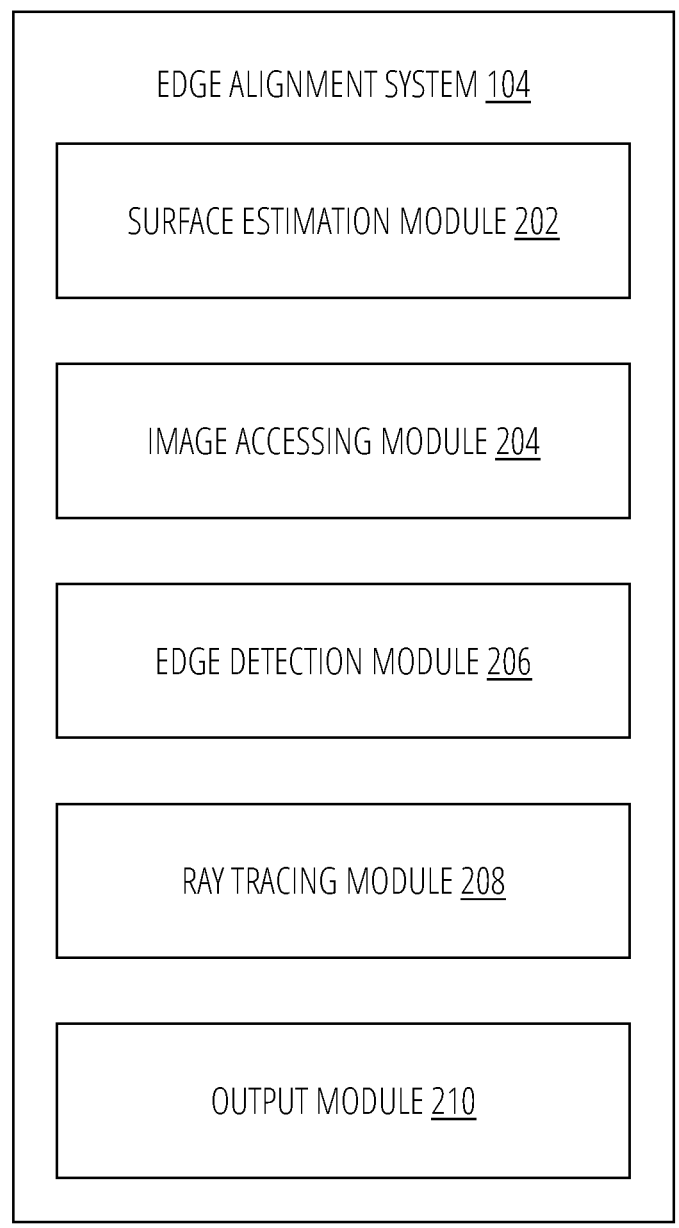
FIG. 2 is a block diagram of the edge alignment system of the AR device of FIG. 1.

FIG. 2 is a block diagram of an edge alignment system 104, according to some examples. A skilled artisan will recognize that various additional functional components may be supported by the edge alignment system 104 to facilitate additional functionality that is not specifically described herein. The various functional modules depicted in FIG. 2 may reside on a single computing device or may be distributed across several computing devices in various arrangements such as those used in cloud-based architectures.

As shown, the edge alignment system 104 includes a surface estimation module 202, an image accessing module 204, an edge detection module 206, a ray tracing module 208, and an output module 210. The operation of these modules is described in detail below with reference to method 500 of FIG. 5. However, a functional summary of these modules is described immediately below.

The surface estimation module 202 is configured to generate or otherwise obtain surface plane information defining a surface plane passing through a surface location and oriented according to a surface normal. The surface location indicates a location that the surface plane passes through; for example: a point in real-world space on a surface of a real-world object. In some examples, the surface location can be represented by a 2D pixel coordinate and a depth value, wherein the 2D pixel coordinate corresponds to a known angular displacement from an optical axis of one of the optical sensors 108, 110 and the depth value corresponds to a depth from the optical sensor. In some examples, the surface location can be represented by other means, such as an aggregate or averaged value calculated from multiple images, such as images from the first optical sensor 108 and second optical sensor 110 (or multiple spatially-separated images from a single camera), such that the surface location is represented by a direction (e.g., an angular displacement from an axis projecting from a center point of the AR device 100 based on an average of the angular displacement from the optical axis of each optical sensor 108, 110) and a depth (e.g., an average of the depth calculated from each optical sensor 108, 110). The surface normal indicates an orientation of the surface plane and indicates a direction that is perpendicular to the surface at a point on the surface, such as the surface location.

In some examples, the surface estimation module 202 obtains the surface plane information from sources other than the optical sensors 108, 110 of FIG. 1. For example, the surface plane information can be received via a communication link from another device, or the surface plane information can be generated using different sensor types, such as depth sensors (e.g., LIDAR sensors). However, as described in greater detail below, there may be benefits to using the optical sensors 108, 110 to generate the surface plane information.

The surface estimation module 202, as well as the ray tracing module 208 and the output module 210 described below, relay on pose data for the AR device 100 of FIG. 1 to relate the images generated by the optical sensors (or other sensors, such as depth sensors) to data representations of the spatial environment of the AR device 100, such as surface plane information, 3D line representations, and so on. The pose data can be generated by position components 834 described below with reference to FIG. 8, such as an inertial measurement unit (IMU) including one or more accelerometers, potentially combined with additional data such as visual odometry data or visual simultaneous localization and mapping (SLAM) data derived from one or more cameras. The pose data can also include a spatial model of the relationship between the optical sensors (and/or other sensors) and the other parts of the AR device 100, such as display 106 of FIG. 1. The spatial model allows the field of view of the sensors to be mapped to the display for accurate presentation of virtual content on the display having a specific spatial relationship with image content captured by the sensors, and it also allows the images from two or more sensors to be mapped to each other to implement stereo vision or other image combination techniques, as described below.

The image accessing module 204 retrieves images from the optical sensors 108, 110. The images captured by each optical sensor 108, 110 may be retrieved continuously in real time and processed to perform the functions of the additional modules described below.

The edge detection module 206 processes the images retrieved by the image accessing module 204 to detect 2D edges in the images and select 2D edges that meet certain criteria, as described in greater detail below.

The ray tracing module 208 performs a ray tracing operation to determine the intersection of rays cast from the AR device 100, through points on the 2D line, with the surface plane. The ray tracing module 208 then uses this intersection information to project the 2D line onto the surface plane, thereby determining a 3D line corresponding to the 2D line.

The output module 210 provides data defining the determined 3D line and surface plane to the AR processing system 102. In turn, the AR processing system 102 may use the determined 3D line and surface plane to generate and present virtual content that appears to be overlaid on the surface of the object and aligned with, or otherwise having a specific spatial relationship to, the 3D line.

Figure 3:
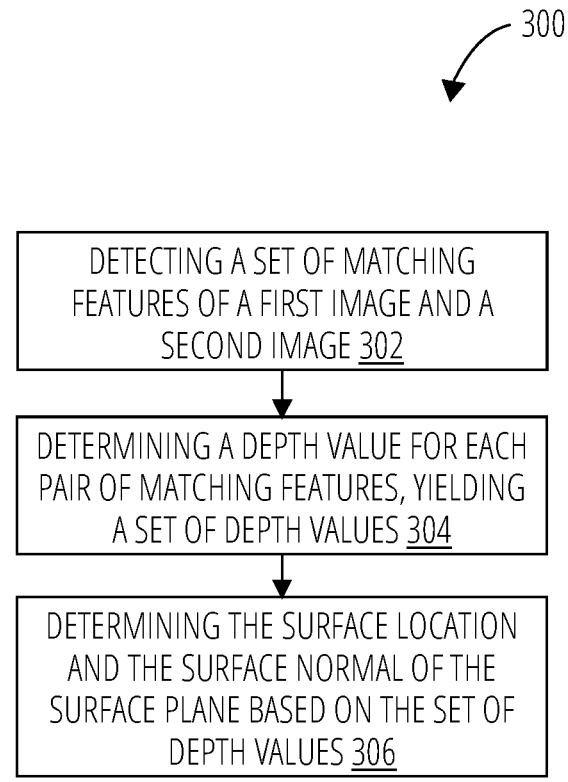
FIG. 3 is a flowchart showing operations of a method for determining a surface plane of a real-world object, according to some examples.

FIG. 3 shows operations of an example method 300 for determining a surface plane of a real-world object using stereoscopic image data, such as images from the first optical sensor 108 of FIG. 1 and second optical sensor 110 of FIG. 1. The method 300 provides an example of how the surface estimation module 202 of FIG. 2 can generate the surface plane information using images from the optical sensors, by determining a surface plane of an object using stereo vision within a limited predetermined window of images.

Unlike techniques that rely on depth sensors, stereo vision allows for the extraction of three-dimensional information from digital images. To utilize stereo vision, two optical sensors are displaced at known locations from one another and used to capture overlapping images depicting two differing views of the real-world environment from two different vantage points. The relative depth of the objects captured in the images is determined by comparing the relative positions of the objects in the two images. For example, the known distance between the two optical sensors and the known vantage points of the of the two optical sensors can be used along with the relative positions of the objects in the captured images to estimate the depth of the objects using triangulation.

To further reduce computing resource consumption, the surface estimation module 202 can limit the use of stereo vision to a predetermined window within the images captured by the optical sensors. For example, the predetermined window may be a sub-portion of the images that is in the center of the images captured by the optical sensors. Limiting use of stereo vision to the predetermined window allows for stereo vision to be used with limited computing resources.

Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes detecting a set of matching features of a first image and a second image at operation 302. The surface estimation module 202 uses stereo vision to identify a set of matching features in a pair of corresponding images captured by the optical sensors. The matching features are recognizable points (e.g., distinctive areas) of a physical object in the real-world environment, such as corners, edges, and the like. The continuous surface and depth estimation system identifies features within the predetermined window of one of the images and then searches for the same features in the corresponding image.

According to some examples, the method 300 includes determining a depth value for each pair of matching features, yielding a set of depth values at operation 304. The surface estimation module 202 can determine a depth value for each pair of matching features that was identified in each of the corresponding images. For example, the continuous surface and depth estimation system uses the location of the features in the images, along with the known orientation of the optical sensors (e.g., distance between the optical sensors and vantage points of the optical sensors) to triangulate the depth of the features.

According to some examples, the method 300 includes determining the surface location and the surface normal of the surface plane based on the set of depth values at operation 306. The set of depth values computed at operation 304 is used to estimate a surface plane indicating the depth and surface normal of a surface of a physical object. For example, the surface estimation module 202 uses methods such as Random Sample Consensus (RANSAC) to determine the surface plane of the object.

In some cases, the surface estimation module 202 may not be able to identify a sufficient number of matching features within a pair of corresponding images to determine a surface plane for the object. In these types of situations, the surface estimation module 202 may estimate the depth of the object based on the matching features that are available and utilize the surface normal from a previous set of corresponding images to determine the surface plane. If the number of matching features is insufficient to determine even the depth of the object (e.g., no matching features are identified), the surface estimation module 202 may use ray casting to determine the surface plane. For example, the continuous surface and depth estimation system may cast a ray towards a previously known surface plane (e.g., the last known surface plane) to determine the depth of the object.

Figure 4:
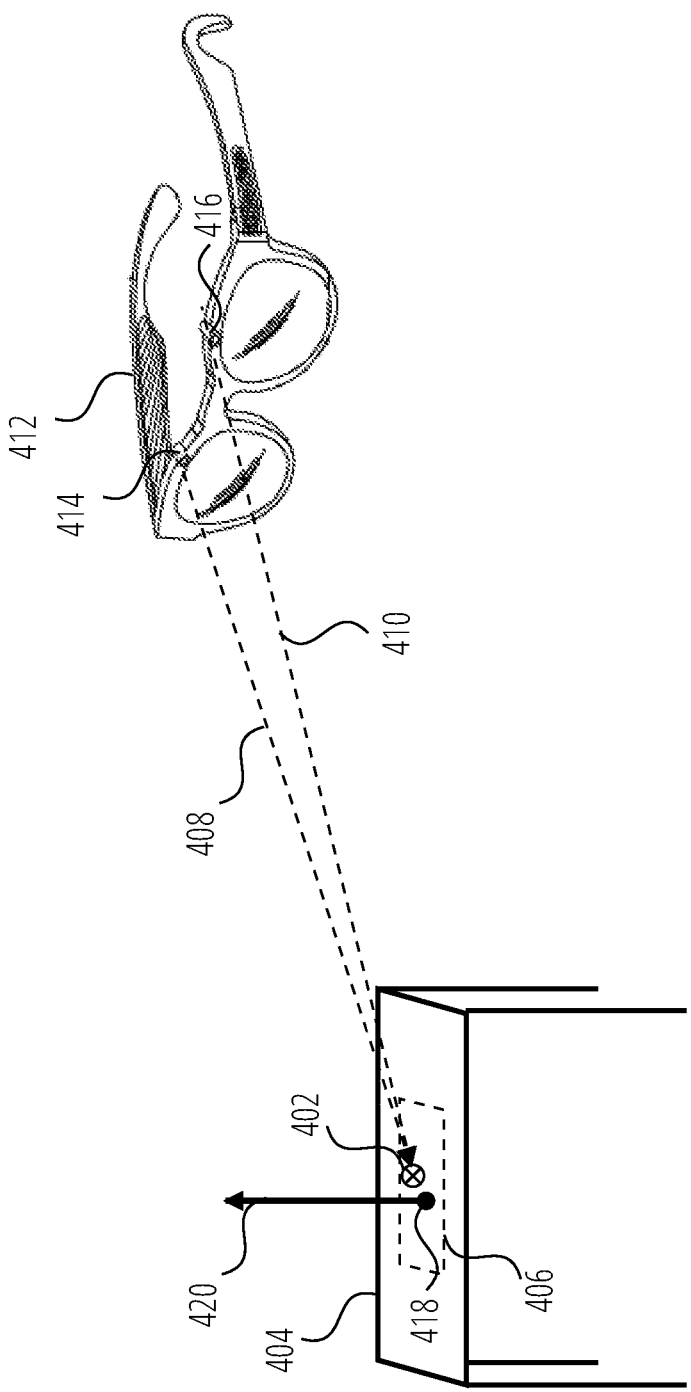
FIG. 4 is an isometric view of a real-world object with a surface plane being determined by an AR device in accordance with the method of FIG. 3.

FIG. 4 shows an example of the AR device 100 of FIG. 1 as a head wearable apparatus 412, specifically a pair of AR glasses, performing the method 300 of FIG. 3 to determine a surface plane corresponding to a real-world tabletop. The head wearable apparatus 412 has a first optical sensor 108 of FIG. 1 (shown as right camera 414) and a second optical sensor 110 of FIG. 1 (shown as left camera 416). A real-world table is visible in front of the head wearable apparatus 412, the table having a tabletop defining physical surface 404. At operation 302 of method 300, the images from the left camera 416 and right camera 414 are processed by the surface estimation module 202 to identify a matching feature 402 visible on the physical surface 404 in both images, i.e., a pair of matching features in the two images, each half of the pair corresponding to the matching feature 402 visible in the respective image. The image captured by the right camera 414 may identify the matching feature 402 at a direction defined by a view from first optical sensor 408, whereas the image captured by the left camera 416 may identify the matching feature 402 at a direction defined by a view from second optical sensor 410. Additional pairs of matching features (not shown) may also be identified. At operation 304 of FIG. 3, depth information is computed for each pair of matching features. At operation 306 of FIG. 3, the surface plane 406 is determined based on the depth information. The surface plane 406 is determined to include a surface location 418 on the surface plane 406 and a surface normal 420 perpendicular to the surface plane 406.

Figure 5:
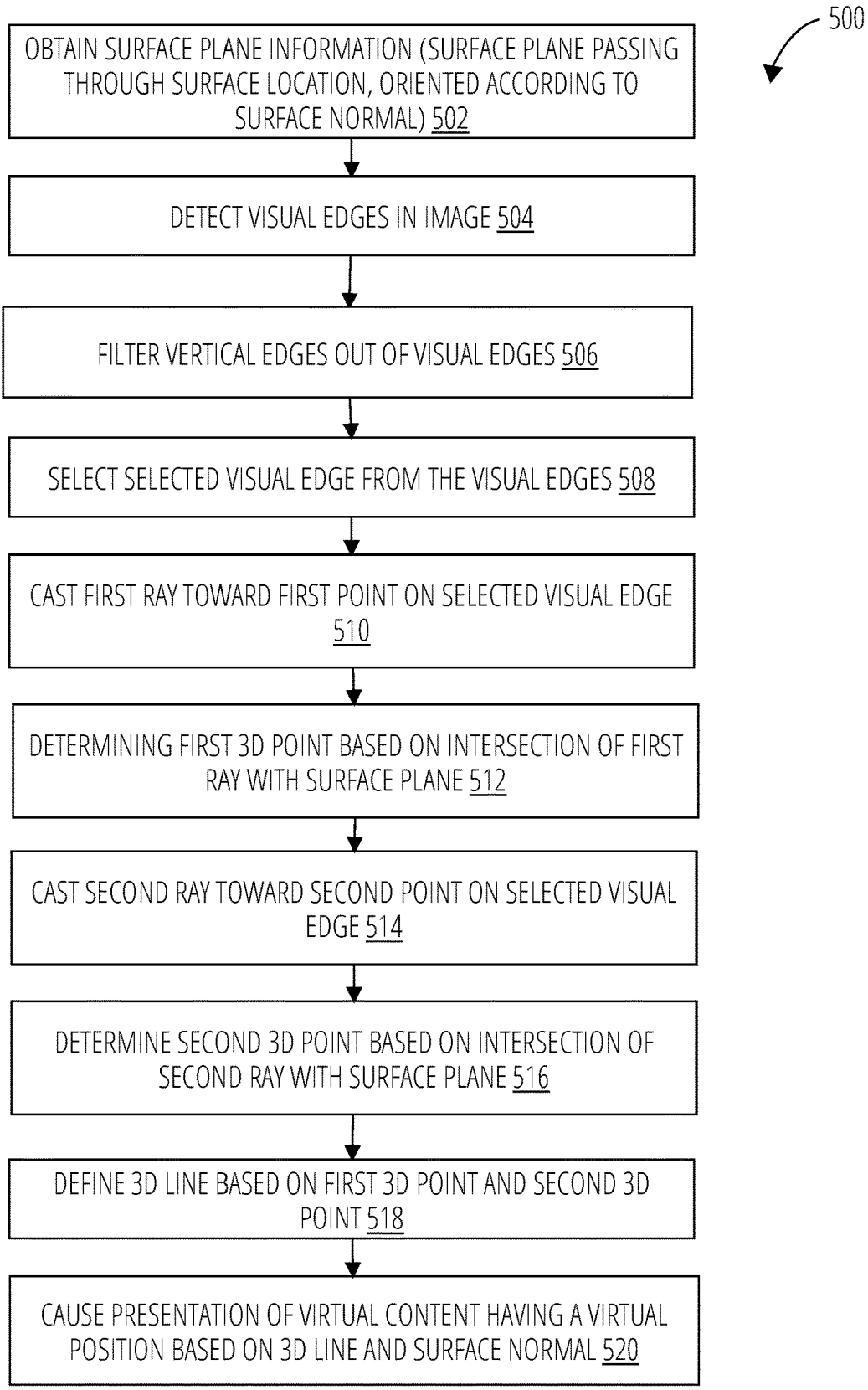
FIG. 5 is a flowchart showing operations of an example method for aligning virtual content to an edge of a real-world object, according to some examples.

FIG. 5 shows an example method 500 for aligning virtual content to an edge of a real-world object. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence. Although method 500 is described as being performed by the edge alignment system 104 of AR device 100 of FIG. 1, it will be appreciated that some examples will be performed using other devices, systems, or functional modules.

According to some examples, the method 500 includes obtaining surface plane information at operation 502. The surface plane information defines a surface plane passing through a surface location, oriented according to a surface normal. In some examples, operation 502 is performed according to method 300 of FIG. 3 described above. In other examples, the surface plane information is obtained by other means by a surface estimation module 202 of FIG. 2 operating according to principles that differ from those of method 300, as described above.

According to some examples, the method 500 includes detecting visual edges in an image at operation 504. The image accessing module 204 of FIG. 2 retrieves an image from at least one of the optical sensors, e.g., first optical sensor 108 of FIG. 1. The edge detection module 206 of FIG. 2 processes the image to detect visual edges, using any suitable edge detection computer vision methodology. In some examples, only edges corresponding to straight lines are detected or propagated for further processing at subsequent operations. The output of operation 504 is therefore a set of visual edges corresponding to straight 2D lines.

According to some examples, the method 500 includes filtering vertical edges out of the set of visual edges at operation 506. In some examples, it is an aim of the edge alignment system 104 to orient virtual content with horizontal edges of a real-world object, and thus the removal of vertical edges is desirable. The filtering may remove from the set of visual edges all edges having an orientation close to (e.g., within a predetermined threshold of) a vertical orientation. In some examples, verticality may be measured based on a known gravity vector, e.g., as obtained from an inertial measurement unit (IMU) of the AR device 100 (or other position components 834 as described below with reference to FIG. 8). In some examples, verticality may be measured relative to the field of view of the optical sensor: thus, for example, a user lying down on his or her side may filter out lines parallel to the ground, such that virtual content is aligned with vertical edges (with respect to gravity), allowing the virtual content to be oriented to match the user's orientation. In other examples, operation 506 may be omitted from method 500, as the edge alignment system 104 is configured to potentially align virtual content with vertical edges of real-world objects as well, such as vertical edges of walls. The output of operation 506 is therefore a set of visual edges corresponding to non-vertical edges.

According to some examples, the method 500 includes selecting a selected visual edge from the set of visual edges at operation 508. The selected visual edge is selected from the set of visual edges output by operation 506 based on one or more selection criteria. In some examples, the selection criteria include a surface plane proximity criterion indicating an estimated proximity of the selected visual edge to the surface plane, or more specifically, proximity of the selected visual edge to the surface location. Proximity may be computed using any suitable means, e.g., estimated 3D distance of one or more points on the selected visual edge to the surface plane. In some examples, a 3D line is determined from each of two or more visual edges at operations 510 through 518 below, a surface plane proximity is computed for each of the two or more visual edges, and the selected visual edge is selected from the two or more visual edges based on the computed surface plane proximity values.

In some examples, the selection criteria include other criteria, such as a 3D corner criterion indicative of whether the visual edge corresponds to an edge or corner of a 3D object as opposed to a color contrast edge between two portions of a 2D surface. Some examples may be configured to select a 3D corner (e.g., an edge of a tabletop) as the selected visual edge instead of a color contrast edge (e.g., the edge of a piece of paper lying on a tabletop). The 3D corner criterion may be applied based on depth information for the set of visual edges as well as adjacent regions of the image, thereby indicating changes in direction of a depth gradient near a visual edge, thereby indicating a corner.

In some examples, depth information for the edges may be used in applying a proximity criterion. For example, edge depth information representative of a depth of the one or more visual edges may be obtained (e.g., from stereo vision or a depth sensor). The edge depth information is processed to determine, for each visual edge of the one or more visual edges, a respective three-dimensional position. The selected visual edge may then be selected based on a proximity of the three-dimensional position of the selected visual edge to the surface location.

According to some examples, the method 500 includes casting a first ray toward a first point on the selected visual edge at operation 510. The ray tracing module 208 of FIG. 2 selects a first point on the selected visual edge, such as a first endpoint (e.g., a left endpoint) of the selected visual edge. This first point corresponds to a direction represented by, e.g., an (X,Y) pixel coordinate in the image corresponding to an angular displacement from an optical axis of the first optical sensor 108. The ray tracing module 208 performs ray casting toward this direction by projecting a simulated ray in the determined direction until the length of a vector extending along the ray equals the depth of the surface plane in the determined direction from the AR device 100.

According to some examples, the method 500 includes determining a first 3D point based on an intersection of the first ray with the surface plane at operation 512. The direction and depth of the vector extending along the first ray correspond to a 3D point in 3D space, on the surface plane, representing a projection of the first point onto the surface plane from the vantage point of the AR device 100.

According to some examples, the method 500 includes casting a second ray toward a second point on the selected visual edge at operation 514. The ray tracing module 208 selects a second point on the selected visual edge, such as a second endpoint (e.g., a right endpoint) of the selected visual edge. Ray casting is performed through this second point as at operation 510.

According to some examples, the method 500 includes determining a second 3D point based on an intersection of the second ray with the surface plane at operation 516. The projection of the second point onto the surface plane is performed as at operation 512, resulting in a second 3D point representing the projection of the second point onto the surface plane.

According to some examples, the method 500 includes defining a 3D line based on the first 3D point and the second 3D point at operation 518. Given the first 3D point generated at operation 512 and the second 3D point generated at operation 516, a 3D line can be defined that passes through these two 3D points. In some examples, the 3D line is a line segment that extends from the first 3D point to the second 3D point.

According to some examples, the method 500 includes causing presentation of virtual content having a virtual position based on the 3D line and the surface normal at operation 520. The 3D line information generated at operation 518 and at least a portion of the surface plane information obtained at operation 502 are output by the output module 210 of FIG. 2. An AR component, consisting of virtual content such as a virtual object, can then be presented to a user via the display 106 by the AR processing system 102. The apparent location and orientation of the virtual object within the display 106, relative to the real-world environment visible through or on the display 106, is determined by the 3D line generated at operation 518, as well as the surface plane information. It will be appreciated that the 3D line defines multiple 3D locations located within the surface plane; therefore, any of these points can serve as a surface location, and only the surface normal information is necessary for defining the surface plane one the 3D line has been determined.

The virtual content includes orientation and shape information defining how the virtual content is intended to be oriented and located. In some examples, the virtual content has a first orientation vector serving as an orientation reference value for the virtual content. For example, a virtual object (such as a virtual clock) may include a first orientation vector defining an "upward" direction of the virtual clock, such that the clock is intended to be placed on a horizontal surface such that the first orientation vector is parallel to the surface normal of the horizontal surface, resulting in the clock being oriented with 6 o'clock close to the horizontal surface and 12 o'clock far from the horizontal surface. Similarly, a virtual rectangular sign may include a first orientation vector defining a "front" direction, such that the virtual sign is intended to be placed on a vertical surface such that the first orientation vector is parallel to the surface normal of the vertical surface, resulting in the sign being oriented such that its content faces outward from the vertical surface toward a viewer.

In some examples, the virtual content has a second orientation vector serving as a second orientation reference value for the virtual content, e.g., indicating a "front" direction for the virtual clock or a "top" direction for the virtual sign. In some examples, the virtual content has an anchor point and/or one or more boundaries, edges, surfaces, or corners that can be used to determine where the virtual content is intended to be located along the surface normal, and relative to the (X,Y) coordinates within the surface plane. For example, the virtual clock may include an anchor point defining a front left bottom corner of a rectangular prism-shaped bounding box of the clock. The virtual clock 620 may include a bottom surface defined as a planar virtual surface, and the bottom surface may be aligned parallel to the surface plane. The virtual clock 620 may include a bottom front edge, and the bottom front edge may be aligned parallel to the 3D line 606. It will be appreciated that a number of schemes can be used for defining spatial orientation and shape information of a virtual object in various examples.

The AR processing system 102 can thus present the virtual content on the display 106 such that the virtual content is oriented and located according to a virtual position having a specific relationship to the 3D line and the surface normal. In some examples, the virtual content is oriented such that its first orientation vector is parallel to the surface normal. In some examples, an edge or corner of the virtual content is aligned to be collinear with a portion of the 3D line. In some examples, the edge or corner of the virtual content is aligned to be parallel to the 3D line, within the surface plane, and offset by a fixed distance from the 3D line. It will be appreciated that various examples can define the specific relationships between the location and position of virtual content and the 3D line and surface plane in various ways. The known relationship between the optical sensors, the vantage point of a wearer of the glasses, and the display 106 enables the presentation of the virtual content in the virtual position in a specific visual relation to the physical environment shown in the image captured by the optical sensor.

In some examples, the method 500 may be performed continuously, such that the position of the virtual content is updated as the field of view of the optical sensors changes. In some examples, virtual content may be presented in a default position until a suitable surface plane and 3D line are identified near the position of the virtual content, at which point the virtual content snaps into alignment with the 3D line and surface plane. In some examples, after snapping into alignment, the virtual content remains aligned with the 3D line and surface plane as the field of view of the optical sensors changes. In some such examples, the position of the virtual object can be maintained with reference to the pose data of the AR device 100, without continuing to perform ongoing detection of the surface plane or the 3D line. In other examples, the virtual content may be relocated to another 3D line and surface plane if the field of view diverges too far from the first identified 3D line and surface plane, such that the virtual content is always displayed within the user's field of view, aligned with a suitable surface and edge.

In some examples, a virtual object may be placed on, or in contact with, a surface, either by the user or through the action of other operations within the AR processing system 102. In some such examples, the virtual object may initially be placed in contact with (or close to) the surface in a first position, and the AR processing system 102 may then update the position of the virtual object to align it with the 3D line. This update may take place before or after the virtual object has been placed or released by the user in various examples. Thus, for example, a user holding a virtual clock may move the virtual clock close to a real-world tabletop and release the virtual clock, at which time the virtual clock settles or snaps into place level with the tabletop, aligned along the front edge of the tabletop, and with its face facing outward toward the front edge of the tabletop.

In some examples, an AR device may be configured to render virtual content at a relatively high frame rate, while sensor data (e.g., image data generated by optical sensors) is provided at a lower frame rate. To address this, a position of the estimated surface plane and 3D line may be predicted forward for every subsequent frame rendered by the system in order to account for the unavailable data. As an illustrative example, if the rendering frame rate applied by the AR device 100 is at 60 Hz, but the images are only provided by the optical sensors at a rate of 30 Hz, then the position of the estimated surface plane and 3D line may be predicted forward for every subsequent frame rendered by the system by propagating the previously known surface plane forward (e.g., by using a Kalman filter or a Double Exponential Smoothing filter).

Figure 6:
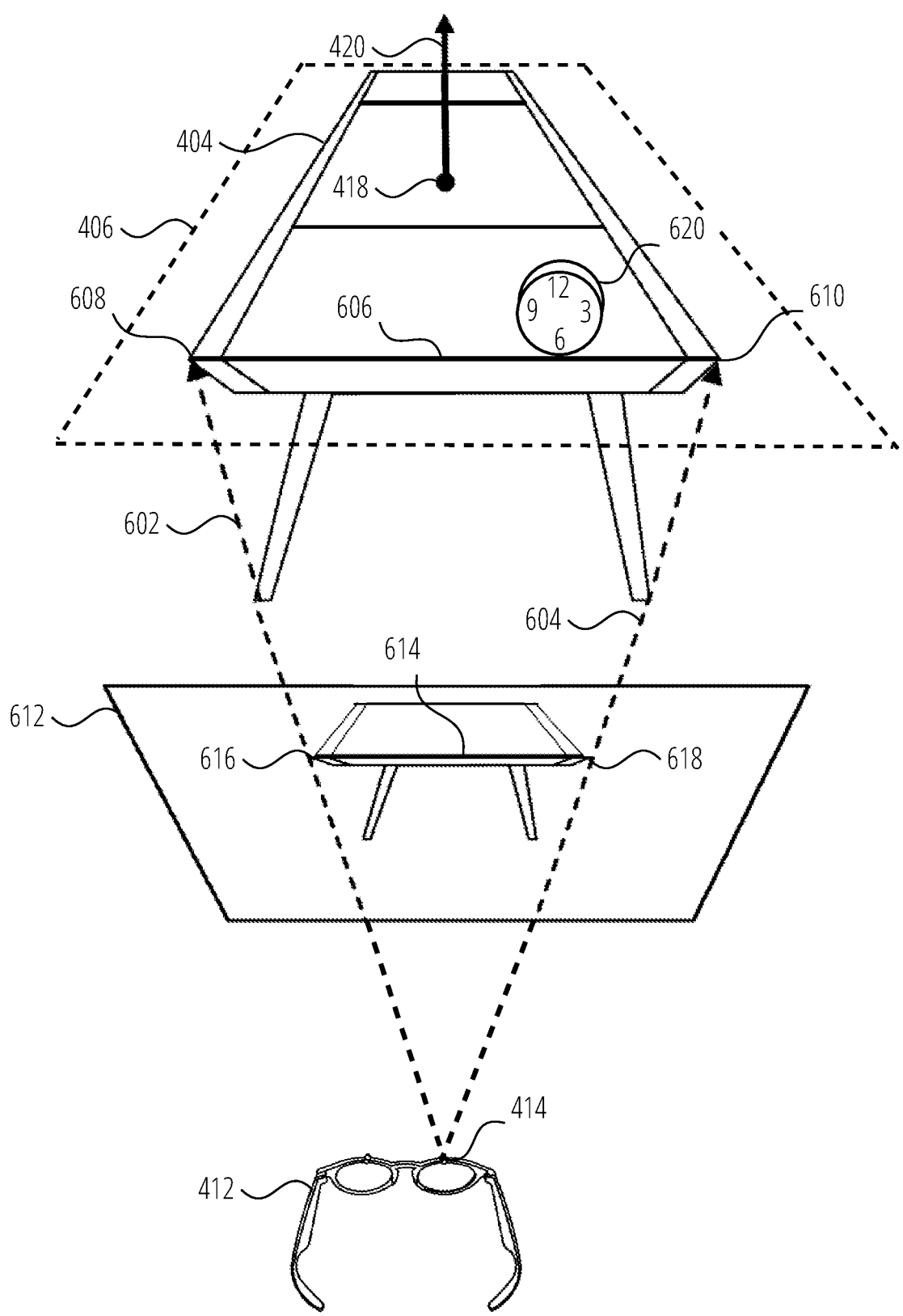
FIG. 6 is an isometric front upper view of the real-world object of FIG. 4 with the AR device of FIG. 4 performing the method of FIG. 5 to align virtual content with a detected edge of the real-world object.

FIG. 6 shows an isometric front upper view of the physical surface 404 and the head wearable apparatus 412 performing the method 500 of FIG. 5 to align virtual content with a detected edge of the real-world object.

The surface plane 406 generated by the surface estimation module 202 of FIG. 2, for example, according to method 300 of FIG. 3, is shown as coplanar with the physical surface 404, as in FIG. 4. This representation of the surface plane as surface plane information is obtained at operation 502.

An image 612 is retrieved from the first optical sensor 108 of FIG. 1 (e.g., right camera 414) and processed to detect visual edges at operation 504 of FIG. 5. At operation 508 of FIG. 5, selected visual edge 614 is selected, for example, based on one or more selection criteria described above.

The first ray 602 is projected through a first point 616 (shown as the left endpoint) of the selected visual edge 614 at operation 510 of FIG. 5. At operation 512 of FIG. 5, the first ray 602 intersects with the surface plane 406 to define a first 3D point 608. The ray-casting operations 514, 516 of FIG. 5 are then performed similarly for the second ray 604 through second point 618, to determine second 3D point 610.

The 3D line 606 is then defined as passing through the first 3D point 608 and second 3D point 610. The 3D line 606 corresponds to the front top edge of the real-world physical surface 404.

After the 3D line 606 and surface normal 420 are determined, virtual content, shown as virtual clock 620, is presented on the display 106 in the location shown in FIG. 6, having a specific orientation and location relative to the 3D line 606 and surface normal 420. Specifically, in the illustrated example, the virtual clock 620 is oriented with its 12 o'clock away from the physical surface 404, its bottom face coplanar with the physical surface 404, its front face facing toward the 3D line 606, its bottom front edge (e.g., a bottom front edge of its bounding box) collinear with the 3D line 606 and located on the far side of the 3D line 606 from the head wearable apparatus 412. All of these orientations and locations may enhance the visibility and naturalness of the presentation of the virtual clock 620 to a user and may reduce the amount of discomfort or cognitive dissonance the user may feel in viewing or interacting with the virtual clock 620.

Figure 7:
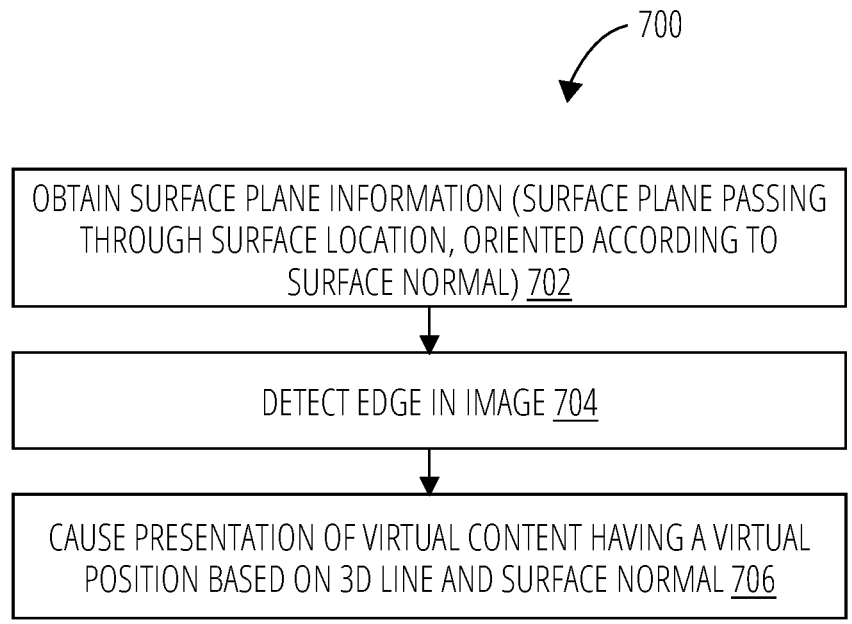
FIG. 7 is a flowchart showing operations of a second example method for aligning virtual content to an edge of a real-world object, according to some examples.

FIG. 7 shows a second example method 700 for aligning virtual content to an edge of a real-world object. Method 700 provides a more general version of method 500 of FIG. 5, in which the implementation of the edge alignment techniques is not limited to 2D images captured by optical sensors, and is not limited to the determination of a 3D line used for alignment of the virtual content.

Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes obtaining surface plane information at operation 702. The surface plane information defines a surface plane passing through a surface location, oriented according to a surface normal. As in method 500 of FIG. 5, operation 702 may be performed according to method 300 of FIG. 3 described above in some examples. In other examples, the surface plane information is obtained by other means by a surface estimation module 202 of FIG. 2 operating according to principles that differ from those of method 300, as described above, such as the use of depth sensors to generate a depth image, which is processed to determine the surface plane.

According to some examples, the method 700 includes detecting an edge in an image at operation 704. The image used in operation 704 may be a 2D image captured by an optical sensor, or it may be another image type, such as a depth image captured by a depth sensor. Detecting the edge may be performed according to operations 504, 506, and 508 of method 500 of FIG. 5 if the image is a 2D image. In some examples, the image is a depth image, and the edge is detected by processing the depth information of the depth image to detect changes in a depth gradient along a straight line, which may indicate a corner or straight edge of a real-world object.

According to some examples, the method 700 includes causing presentation of virtual content having a virtual position based on an orientation of the edge and the surface normal at operation 706. In different examples, alignment of the virtual content with the edge can be performed using various techniques. In some examples, a 3D line is determined as in method 500, and the virtual content is presented in alignment with the 3D edge and the surface plane. In some examples, using 2D images captured by optical sensors, a second plane can be defined to pass through the optical sensor used to capture the image (e.g., right camera 414 of FIG. 4), the first point 616 on the selected visual edge 614, and the second point 618 on the selected visual edge 614. The second plane and the surface plane information can be used to align the virtual content. For example, the surface normal of the surface plane can be used to compute a normal of the second plane by computing two dot products. The virtual content can then be aligned with both the surface plane and the second plane. The intersection of the surface plane and the second plane corresponds to the 3D line determined in method 500; however, in this alternative approach, the 3D line is never determined explicitly.

In some examples, depth information (e.g., captured by a depth sensor) is processed to identify both the surface plane and the 3D line corresponding to an edge of the surface defining the surface plane, and the virtual content is presented in alignment with the surface plane and the 3D line.

Machine Architecture

Figure 8:
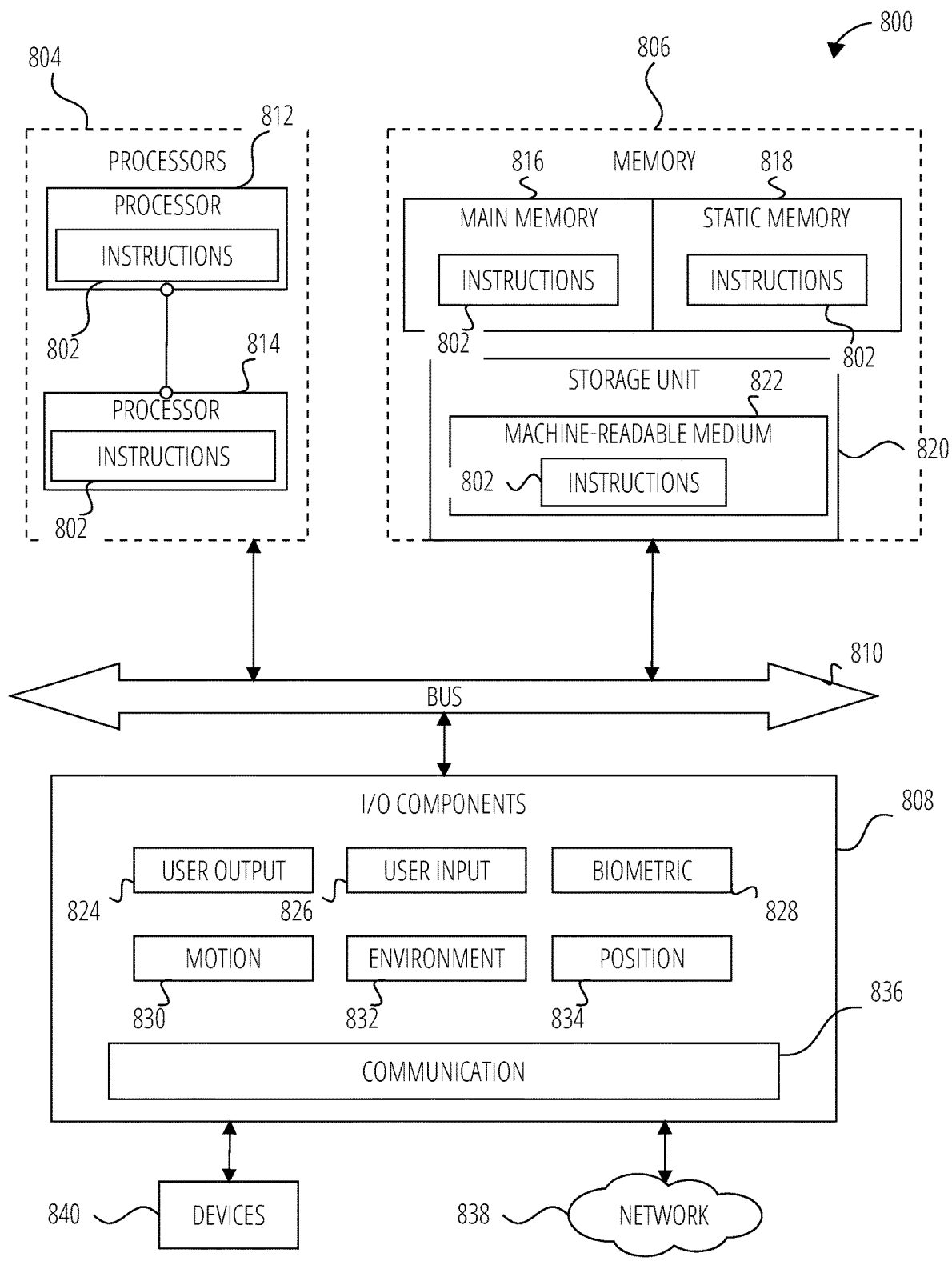
FIG. 8 is a diagrammatic representation of a machine in the form of a computer system within which a set of instructions may be executed to cause the machine to perform any one or more of the methodologies discussed herein, according to some examples.

FIG. 8 is a diagrammatic representation of the machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the methods described herein. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. In some examples, the machine 800 may comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 806, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as the display 106, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or more cameras (with still image/photograph and video capabilities) such as first optical sensor 108 of FIG. 1 and second optical sensor 110 of FIG. 1, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth sensors (such as one or more LIDAR arrays), or other components that may provide indications, measurements, or signals corresponding to a surrounding physical environment.

With respect to cameras, the machine 800 may have a camera system comprising, for example, front cameras on a front surface of the machine 800 and rear cameras on a rear surface of the machine 800. The front cameras may, for example, be used to capture still images and video of a user of the machine 800 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the machine 800 may also include a 360° camera for capturing 360° photographs and videos.

Further, the camera system of the machine 800 may include dual rear cameras (e.g., a primary camera as well as a depth-sensing camera), or even triple, quad or penta rear camera configurations on the front and rear sides of the machine 800. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

Software Architecture

Figure 9:
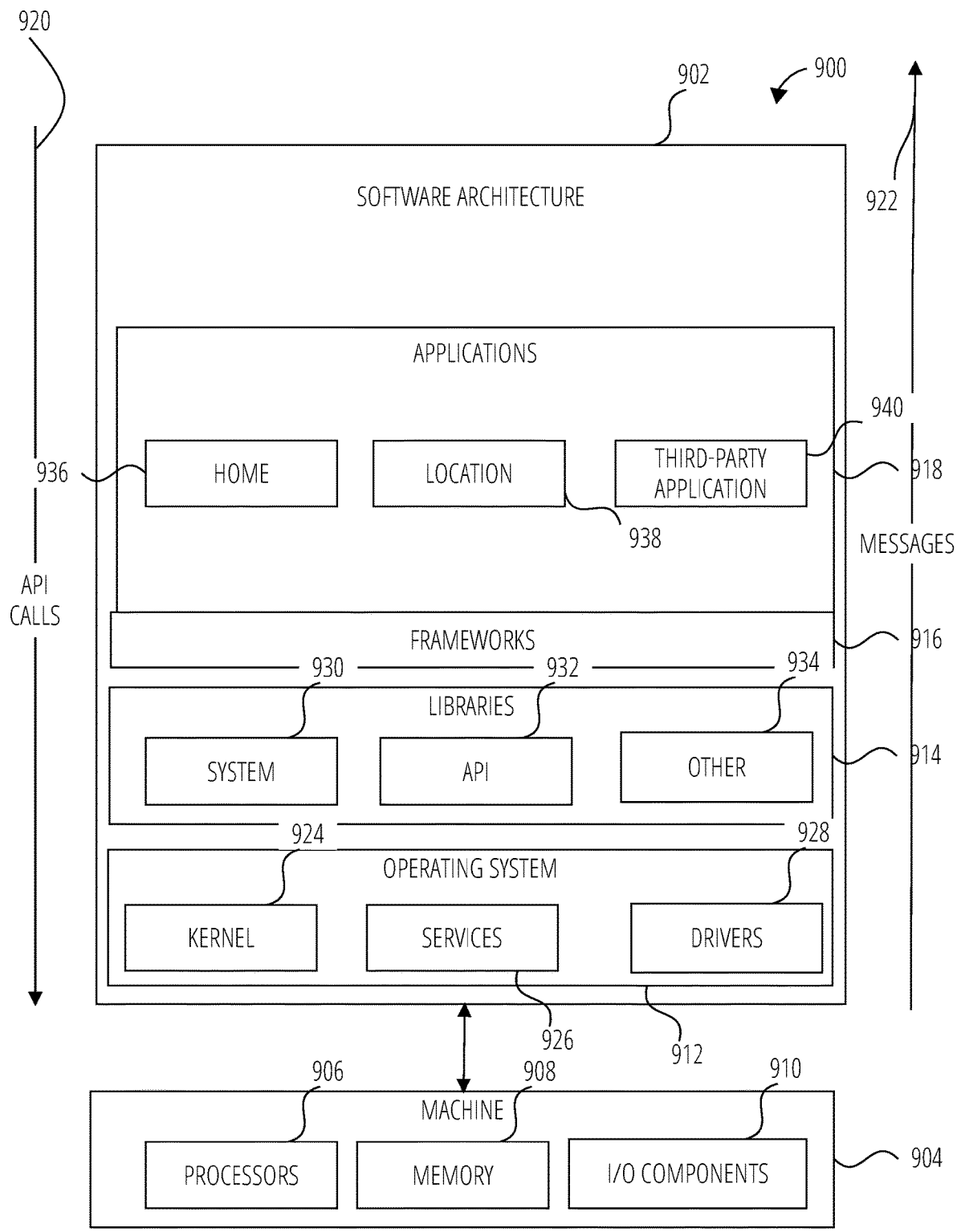
FIG. 9 is a block diagram showing a software architecture within which examples may be implemented.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920. The AR processing system 102 and edge alignment system 104 thereof may be implemented by components in one or more layers of the software architecture 902.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various graphical user interface (GUI) functions, high-level resource management, and high-level location services. The frameworks 916 can provide a broad spectrum of other APIs that can be used by the applications 918, some of which may be specific to a particular operating system or platform.

In an example, the applications 918 may include a home application 936, a location application 938, and a broad assortment of other applications such as a third-party application 940. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 920 provided by the operating system 912 to facilitate functionalities described herein.

CONCLUSION

Examples described herein may address one or more technical problems associated with the presentation of virtual content in AR systems. By aligning virtual content with surface planes and edges of real-world objects present in the user's environment, the virtual content can be made to appear more natural, less distracting, and more visually pleasing. A user viewing or interacting with the virtual content is less likely to be dissatisfied with the placement of the virtual content when it is aligned, thereby reducing the number of attempts made by the user to place or adjust the virtual content, increasing the efficiency of human-computer interaction in AR environments. Alignment of the virtual and physical spatial scene may reduce psychological friction or cognitive dissonance experienced by a user, making it easier for the user to interact with virtual content in general.

Glossary

"Augmented reality" (AR) refers, for example, to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

"2D" refers to two-dimensional objects or spaces. Data may be referred to as 2D if it represents real-world or virtual objects in two-dimensional spatial terms. A 2D object can be a 2D projection or transformation of a 3D object, and a 2D space can be a projection or transformation of a 3D space into two dimensions.

"3D" refers to three-dimensional objects or spaces. Data may be referred to as 3D if it represents real-world or virtual objects in three-dimensional spatial terms. A 3D object can be a 3D projection or transformation of a 2D object, and a 3D space can be a projection or transformation of a 2D space into three dimensions.

"Line" refers to a line or line segment defined by at least two colinear points defined in a 2D or 3D space.

"3D line" refers to a line or line segment defined in a 3D space. The 3D space can be a data representation of a 3D space or a real-world 3D space.

"3D point" refers to a point defined in a data representation of a 3D space or a real-world 3D space.

A "position" refers to spatial characteristics of an entity such as a virtual object, a real-world object, a line, a point, a plane, a ray, a line segment, or a surface. A position can refers to a location and/or an orientation of the entity.

A first location "associated with" an object or a second location refers to the first location having a known spatial relationship to the object or second location.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processors may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled, or owned by a user and with which the user interacts perform an action, or an interaction with other users or computer systems.

What is claimed is:

1. A system comprising:
   a processor; and
   a memory storing instructions that, when executed by the processor, configure the system to perform operations comprising:
   obtaining surface plane information defining a surface plane passing through a surface location and oriented according to a surface normal;
   detecting a visual edge in a 2D image;
   casting two rays through two locations along the visual edge to intersect with the surface plane at two points on the surface plane defining a 3D line in three-dimensional space; and
   causing presentation of virtual content having a virtual position based on an orientation of the 3D line.

2. The system of claim 1:
   further comprising: an optical sensor,
   wherein:
   the 2D image is captured by the optical sensor; and
   the detecting of the visual edge in the image comprises:
   detecting one or more visual edges in the 2D image; and
   selecting a selected visual edge of the one or more visual edges.

3. The system of claim 2, wherein:
   the selecting of the selected visual edge comprises:
   filtering one or more vertical edges out of the one or more visual edges, resulting in one or more non-vertical edges; and
   selecting the selected visual edge from the one or more non-vertical edges.

4. The system of claim 2, wherein:
   the selected visual edge is selected based on a determination that the selected visual edge corresponds to an edge of a physical object.

5. The system of claim 2, wherein:
   the selected visual edge is selected based on a proximity of the selected visual edge to the surface location.

6. The system of claim 5, wherein selecting the selected visual edge comprises:
   obtaining edge depth information representative of a depth of the one or more visual edges;
   processing the edge depth information to determine, for each visual edge of the one or more visual edges, a respective three-dimensional position; and
   selecting the selected visual edge based on a proximity of the three-dimensional position of the selected visual edge to the surface location.

7. The system of claim 1, wherein:
   the system further comprises a display; and
   causing presentation of the virtual content comprises presenting, on the display, the virtual content in the virtual position in relation to a physical environment shown in the image.

8. The system of claim 1, wherein:
   the system further comprises a first optical sensor and a second optical sensor; and
   obtaining the surface plane information comprises:
   detecting a set of matching features of a first image and a second image, the first image captured by the first optical sensor and the second image captured by the second optical sensor, the set of matching features corresponding to physical features of a physical object;
   determining a depth value for each pair of matching features, yielding a set of depth values, each depth value indicating a depth of a respective physical feature of the physical object; and determining the surface location and the surface normal of the surface plane based on the set of depth values, the surface plane corresponding to a surface of the physical object.

9. The system of claim 2, wherein:

the casting of the two rays to define the 3D line comprises:
casting a first ray from a location associated with the optical sensor toward a first point on the visual edge;
determining a first 3D point in three-dimensional space based on an intersection of the first ray with the surface plane;
casting a second ray from the location associated with the optical sensor toward a second point on the visual edge;
determining a second 3D point in three-dimensional space based on the intersection of the second ray with the surface plane; and
defining the 3D line based on the first 3D point and the second 3D point.

10. The system of claim 1, wherein:

the virtual content includes a virtual object having at least one virtual edge; and
the virtual position aligns the virtual edge parallel to the 3D line.

11. The system of claim 10, wherein:

the virtual object has at least one planar virtual surface; and
the virtual position aligns the at least one planar virtual surface parallel to the surface plane.

12. A method comprising:

obtaining surface plane information defining a surface plane passing through a surface location and oriented according to a surface normal;
detecting a visual edge in a 2D image;
casting two rays through two locations along the visual edge to intersect with the surface plane at two points on the surface plane defining a 3D line in three-dimensional space; and
causing presentation of virtual content having a virtual position based on an orientation of the 3D line.

13. The method of claim 12, wherein:

the 2D image is captured by an optical sensor; and
the detecting of the visual edge in the image comprises:
detecting one or more visual edges in the 2D image; and
selecting a selected visual edge of the one or more visual edges.

14. The method of claim 13, wherein:

the selecting of the selected visual edge comprises:
filtering one or more vertical edges out of the one or more visual edges, resulting in one or more non-vertical edges; and
selecting the selected visual edge from the one or more non-vertical edges.

15. The method of claim 13, wherein:

the selected visual edge is selected based on a determination that the selected visual edge corresponds to an edge of a physical object.

16. The method of claim 13, wherein:

the selected visual edge is selected based on a proximity of the selected visual edge to the surface location.

17. The method of claim 12, wherein:

causing presentation of the virtual content comprises presenting, on a display, the virtual content in the virtual position in relation to a physical environment shown in the image.

18. The method of claim 12, wherein:

obtaining the surface plane information comprises:
detecting a set of matching features of a first image and a second image, the first image captured by a first optical sensor and the second image captured by a second optical sensor, the set of matching features corresponding to physical features of a physical object;
determining a depth value for each pair of matching features, yielding a set of depth values, each depth value indicating a depth of a respective physical feature of the physical object; and
determining the surface location and the surface normal of the surface plane based on the set of depth values, the surface plane corresponding to a surface of the physical object.

19. The method of claim 13, wherein:

the casting of the two rays to define the 3D line comprises:
casting a first ray from a location associated with the optical sensor toward a first point on the visual edge;
determining a first 3D point in three-dimensional space based on an intersection of the first ray with the surface plane;
casting a second ray from the location associated with the optical sensor toward a second point on the visual edge;
determining a second 3D point in three-dimensional space based on the intersection of the second ray with the surface plane; and
defining the 3D line based on the first 3D point and the second 3D point.

20. A non-transitory computer-readable storage medium, the computer-readable storage medium including instructions that when executed by a processor of a system, cause the system to perform operations including:

obtaining surface plane information defining a surface plane passing through a surface location and oriented according to a surface normal;
detecting a visual edge in a 2D image;
casting two rays through two locations along the visual edge to intersect with the surface plane at two points on the surface plane defining a 3D line in three-dimensional space; and
causing presentation of virtual content having a virtual position based on an orientation of the 3D line.

* * * * *

UNITED STATES PATENT AND TRADEMARK OFFICE
CERTIFICATE OF CORRECTION

| | | |
|---|---|---|
| PATENT NO. | : 12,450,852 B2 | Page 1 of 1 |
| APPLICATION NO. | : 18/305887 | |
| DATED | : October 21, 2025 | |
| INVENTOR(S) | : Tran et al. | |

It is certified that error appears in the above-identified patent and that said Letters Patent is hereby corrected as shown below:

In the Claims

In Column 22, Line 18, in Claim 2, delete "comprising:" and insert --comprising-- therefor In Column 23, Line 44, in Claim 13, delete "wherein;" and insert --wherein:-- therefor Signed and Sealed this
Sixteenth Day of December, 2025

John A. Squires
*Director of the United States Patent and Trademark Office*